April 9, 1940. H. J. MURRAY 2,196,705
VEHICLE SIGNAL SYSTEM
Filed June 23, 1937
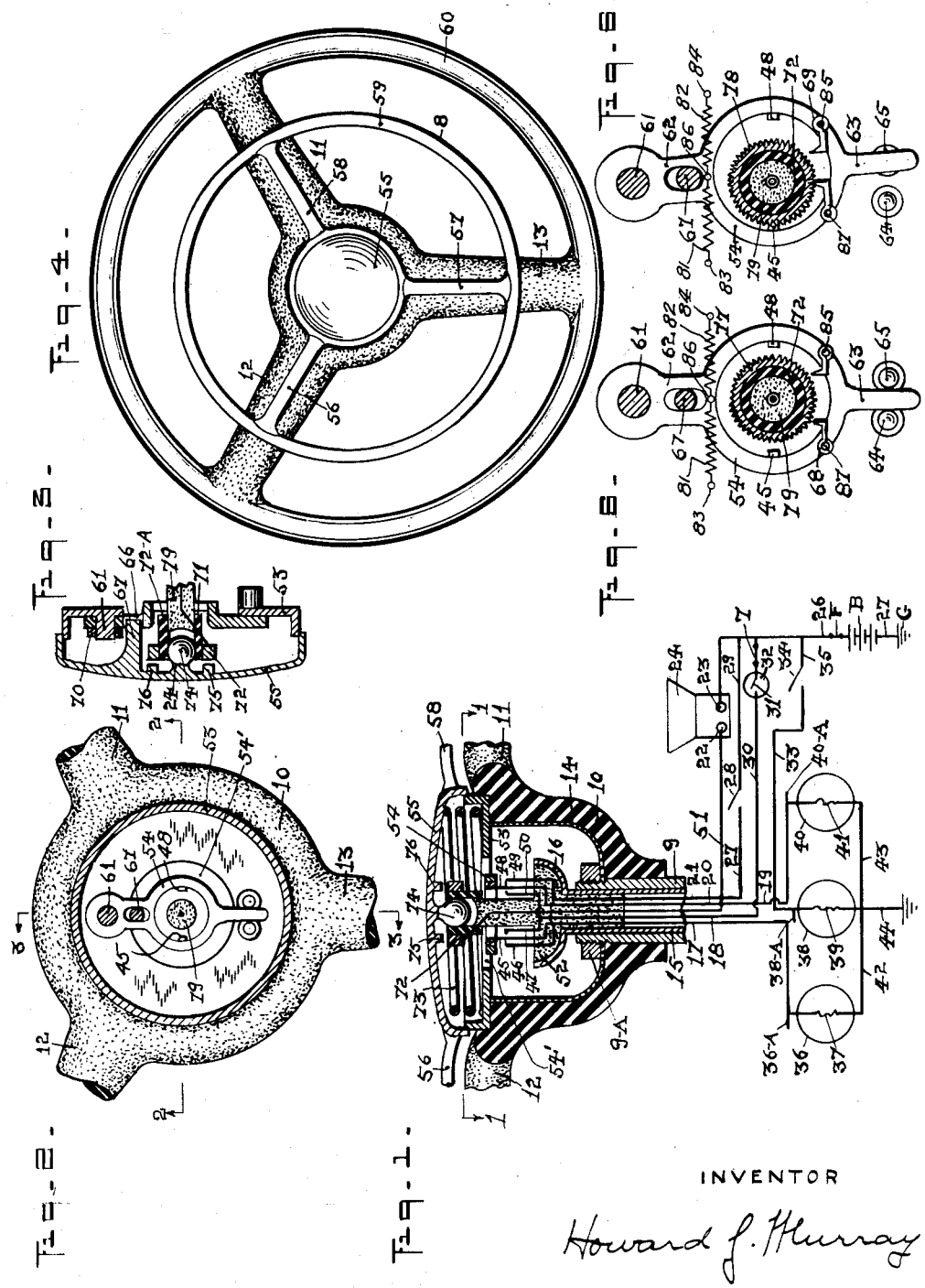
INVENTOR
Howard J. Murray.

Patented Apr. 9, 1940

2,196,705

UNITED STATES PATENT OFFICE 2,196,705

VEHICLE SIGNAL SYSTEM

Howard J. Murray, New York, N. Y.

Application June 23, 1937, Serial No. 149,799

13 Claims. (Cl. 200—59)

My invention relates in general to a semi-automatic visual and acoustic vehicle signalling system for use wherever such a system can be employed and the invention specifically relates to a combined direction and horn signalling system for use on an automobile vehicle equipped with a steering wheel and turning and braking means for indicating certain intents and subsequent actions of the operator of the vehicle, as, for instance, to decrease the rate of motion of the vehicle, to turn the vehicle to the right or left, to indicate the continuance of the turning action, and to indicate the end of the turning action.

The primary object of the present invention is to provide means for selectively supplying constant and intermittent current to conventional visual and acoustic signal units so as to employ the said units collectively and individually to indicate more than one operating intent of the operator to simultaneously indicate the maintenance of one signal and the conclusion of another, and to automatically indicate the conclusion of an indicated action.

More specifically defined, the present invention relates to the construction of the steering mechanism and associated parts of a vehicle equipped with electrical directional and warning signals, the control elements of which are supported on the steering wheel for rotation therewith.

Another object of the present invention is to provide a signal control which may be initiated by the operator's hand during the initial movement of same to operate the vehicle steering wheel at any angular displacement of same, and which signal control will continue to function automatically after the initiating action has ceased as the steering wheel is turned in the indicated direction and thereafter until the steering wheel is turned in a direction opposite to the indicated direction.

A still additional object of the present invention is to provide a control wheel normally movable with the steering wheel means and having a limited freedom of rockable and rotary motion relative to the steering wheel for controlling current to visual and acoustic signal units on vehicles so that certain of the said units will be energized as direction signals as other units are controlled by the said control wheel to function in the usual manner.

A further object of the present invention is to provide a co-incidental visual and acoustic signal system control means that may be set into operative position to direct the flow of current to energize the visual system signal units to thereafter remain undisturbed as a function of the directional operation of the vehicle steering mechanism as the control is additionally operated from a normally biased position to actuate the acoustic signal unit or units. Said control co-incidentally returned to its normal position as a function of a straightening operation of the steering mechanism as it is operated from a biased position to energize the acoustic unit or units.

Various other objects and advantages of the invention will be in part obvious from an inspection of the accompanying drawing and in part will be more fully set forth in the following particular description of one form of mechanism embodying my invention, and the invention also sets forth certain new and novel features of construction and combination of parts hereinafter set forth and claimed.

The present disclosure includes means for conducting current from stationary circuit leads positioned within a stationary column within the rotating steering column to visual and acoustic signal control switches mounted on the said stationary column. These control switches are actuated by a control wheel mounted on the steering wheel to normally rotate therewith and provided with a limited degree of rotatable and rockable freedom relative thereto. The rim of the control wheel is concentric with the rim of the steering wheel so that the rim of the control wheel may be rotated and/or rocked relative to the steering wheel with a single movement of the operator's hand. The said rotation and/or rocking may be effected by a single movement of the operator's hand as an initial act to the turning of the steering wheel. The control wheel is arranged to be set to continue the energization of the selected visual signal or signals without further attention on the part of the operator as long as the steering wheel is turned in the direction indicated without any reversal. During this time the control rim may be rocked to energize the acoustic signal or signals as hereinbefore. When the steering wheel is turned in a direction opposite to that indicated the control wheel will be automatically returned to a normal position and the direction signal de-energized as the signal system is returned to normal status. The control rim may be rocked at any time at any angular displacement of the steering wheel and the control wheel without regard to the status of the signal units. The control rim may be rotated in either direction without rocking same. Thus the acoustic and visual signals may be separately energized.

While the co-incidental signal control wheel of the present disclosure may be used with any form of visual and acoustic signals, it will be described in connection with the use of conventional sound stop and rear signals to selectively introduce circuit elements into supply leads of the said signals to cause the same to become energized as hereinafter described.

In the drawing:

Figure 1 is a section in elevation taken through the axis of the steering column and the circuit connections to complete a circuit organization and the control therefor.

Figure 2 is a top view of the steering wheel hub showing the method of mounting the connection between the control wheel and the control switch for the visual signals.

Figure 3 is a sectional view of the center of the control wheel taken through the axis of the steering column showing the method of centering same on a stationary portion of the steering column.

Figure 4 is a top view of the steering wheel and the control wheel showing the method of mounting the control wheel on the steering wheel.

Figure 5 is an enlarged view of the manually actuated control means of Figure 1 showing the same in a normal position.

Figure 6 shows the control device of Figure 5 actuated to act to energize the right direction signal.

In the accompanying drawing there is shown in more or less diagrammatic form a preferred embodiment of the present invention with the several mechanical parts shown together with the necessary electrical parts and connections, but it is understood that the showings are merely suggestive and must be modified to meet the particular requirements of the different makes of vehicles and steering mechanism upon which it is to be installed and operated.

In the drawing there is shown certain conventional parts now found on vehicles. For instance, there is shown a source of electric energy B grounded on one side at G and the other side from which current is passed through the conventional circuit breaker or fuse F by means of the common lead 26 to the signal system elements. There is also shown the usual stop signal lamps 36 and 40 containing the usual stop signal filaments 37 and 41. It is assumed that the vehicle is also equipped with the usual tail or rear lamp or lamps 38 equipped with the tail signal filament 39 and the tail light switch 34 and that these lamps 36, 38 and 40 are mounted on the rear of the vehicle in the usual manner, as, for instance, a tail lamp between two stop lamps, or a tail lamp adjacent a stop lamp. In addition, it is understood that the leads 36A, 38A and 40A lead to other lamps when required by the conditions under which the system is installed and operated.

There is also shown a conventional horn 24, a normally open brake operated switch 28, and a steering wheel indicated by the numeral 10 of Figure 2.

The hub of the steering wheel 10 is formed in the usual manner to be supported on the rotatable hollow steering shaft 9 so as to be rigidly connected to same by a key (not shown) when the nut 9A is tightened. A stationary hollow shaft 15 telescoped within the rotatable shaft 9 is adjustably attached to a stationary portion (not shown) of the vehicle. The leads 17 and 21 inclusive are passed up through the stationary shaft 15. These leads 17 to 21 end in a moulded insulator holder portion 52 fitted into a metal cap 16 extending into the shaft 15. The cap 16 and the moulded in lead wires are moved into the shaft together to the proper position. The leads 17, 18, 20, 21 and 51 are connected within the moulding to control switch portions 45 to 50 inclusive so as to be divided into two groups of three elements on each side of the centrally disposed stem 79 extending upward from the moulded portion 52. Thus, switch elements 45, 46 and 47 are on one side of said stem and switch elements 48, 49 and 50 are on the other side of the stem.

A base 53 is fitted into the steering wheel hub in a secure manner so as to turn therewith as may be seen by reference to Figure 1. This base is preferably made of metal and formed with an opening 54' through which the similar switch elements 45 and 48 extend upward for some distance.

A coiled spring member 73 is positioned on the base 53. A signal control wheel having a grip rim 59, spokes 56, 57 and 58 and a central portion 55 as shown by Figure 4 is symmetrically positioned relative to the steering wheel rim 60. This central portion 55 is formed with a downwardly extending projection 74 so as to permit the portion 55 to have a limited axial movement in an opening with a reduced end formed in an insulating bushing 72A fitted to the stem 79. The bushing 72A is provided with a horn contact ring 72 to which the horn grounding lead 51 is attached.

The central portion 55 is thus centrally positioned and resiliently mounted on the spring 73 as it rotates in the bushing 72A attached to the stationary stem 79 in turn attached to the cap 16. Thus, the central portion 55 is centered as it rotates with the base 53 and the steering wheel hub 10. The reduced opening at the top of the bushing 72A limits the extent of the upward axial movement of the member 55 and thus the control wheel.

An intermediate signal control member 62 is rotatably mounted on the shaft portion 61 (see Figure 3) of the base 53 and is secured against axial movement on the shaft 61 by means of the nut 70. The control member 62 is normally held in the neutral position shown by Figure 5 by means of the conventional give-away stop members 65 and 64. The member 62 is formed with a ring shaped portion 54 of sufficient diameter so as to normally and approximately just touch the insulated ends of the switch elements 45 and 48 without imparting any tension to same.

A signal finger 67 formed integral with the central portion 55 of the control wheel projects into a slot 66 formed in the member 62. Centering springs 81 and 82 are attached to the member 62 by means of the pin 86 and to the base 53 by means of the pins 83 and 84. Racket locking members 68 and 69 are attached to the control member 62 by means of the pins 85 and 87.

The bushing 72A is provided with a stationary ring shaped toothed ratchet 77 with teeth 78 as shown in Figures 5 and 6.

In operation and assuming that the parts are in position as shown in Figure 1, it will be understood that the steering mechanism parts operate as usual in conventional practice in that the vehicle may be steered by the rotation of the steering wheel rim 60 which will act through the hub portion 10 and the steering column 9 to operate the steering gear connection as is well known in such construction.

Should it be desired to intermittently energize any of the stop signal lamps 36 and 40 (and additional lamps connected to the leads 36A and 40A)

as shown in Figure 1, the proper movement of the control rim 59 of Figure 4 relative to the steering wheel rim 60 and thus the moving of the finger 67 to cause the rotation of the control member 62 about the shaft 61, thus the finger 67 will act to cause the associated circuit closer switch elements 45 and 48 to be selectively moved relative to the remainder of the switch elements of Figure 1.

If the signal control rim 59 is rotated clockwise to a limited extent as viewed from the front of the steering wheel of Figure 4 from a normally neutral or inoperative direction signal position the central portion 55 to which it is attached by means of the spokes 56, 57 and 58 will also be operated clock-wise. In this event, the control finger 67 will also be rotated clock-wise as shown in Figure 6 to move the intermediate control member 62 counter-clockwise about the axis of the shaft 61 and thereby move the switch element 45 out of electrical engagement with the switch element 46 and into electrical engagement with the element 47.

At the same time the control rachet 68 will be moved by the member 62 on the teeth 78. As the switch element 45 is thus moved away from the element 46 constant current from the battery B will be conducted by means of the common lead 26 to the conventional current interrupter 31 (assuming the supply switch 7 is closed), lead 30, lead 18, elements 45 and 47, leads 17 and 19, filament 41, leads 43 and 44 to the ground G. If the tail lamp switch 34 is closed, current will be supplied to the tail filament 39 by means of the leads 33 and 44. If the normally open brake operated foot switch 28 is closed as the control rim 59 is rotated clock-wise to the steering wheel rim 60, the filament 41 will be normally constantly energized as a stop lamp until the element 45 is moved away from the element 46. The constant energization is due to current being supplied by the leads 26, 29, 27 and 21. Thus, the right stop filament 41 will be changed from a normally constantly energized stop signal to a selectively intermittently energized right direction signal filament.

The rotation of the control rim 59 clock-wise will not affect the switch elements 48, 49 and 50 as will be seen by reference to Figure 6. If the foot brake operated switch 28 remains closed, the stop filament 37 will be constantly energized as a stop signal as the filament 41 is intermittently energized as a right direction signal filament. When the signal control rim 59 is operated clock-wise to its right direction signal position, the extending portion 63 of the control member 62 with a depression on the under side is moved over the give-away stop member 65 to a holding position, and thus the member 62 will be held in an operated position as the operator's hand is removed to turn the steering wheel clock-wise, or the control wheel rim may be rocked to close the supply circuit to the horn 24 at the same time the rim 59 is moved clock-wise relative to the rim 60 to actuate the direction signal switch element 45. The operator may also rock the control rim 59 to actuate the horn 24 as the control rim is set in a direction signal operating position. In this vent, the operator may co-incidentally energize both the visual and acoustic signals of the vehicle signalling system with one co-incidental movement of the hand, and this movement may be the initial movement of the operator's hand in the act of turning the steering wheel to turn the vehicle. Thus, the visual and acoustic vehicle signals may be given together or separately in the act of turning the vehicle, or they may be given together or separately as a pre-indication that the vehicle is about to be turned.

The ground lead from the horn terminal 22 is connected to the ring shaped member 72. When the central portion 55 of the signal control wheel 59 is depressed or rocked, the contact projections 75 and 76 from the portion 55 will contact with the ring 72 to permit the horn current to be grounded through the spring 73, lining 14 to the vehicle ground G. Thus, the acoustic signal may be energized in a conventional manner without rocking the control wheel.

Now, let it be assumed that after the control wheel rim 59 has been rotated clock-wise to energize the filament 41 as a right direction signal (with the foot brake operated switch 28 closed to energize the filament 37 as a stop signal to indicate a decrease of the rate of motion of the vehicle) and that the operator has removed the hand from the signal control rim 59. If the rim is fully seated in its right direction signal position, the filament 41 will continue to be energized as a right direction signal, by the action of the interrupter 31 (switch 7 being normally closed). The operator now turns the steering wheel rim 60 clock-wise to turn the vehicle to the right. The control wheel rim 59 and the control member 62 will be turned with the steering wheel as the control member and control wheel rim remain in the selected clock-wise operated position to continue to intermittently energize the right direction filament 41.

As the steering wheel rim 60 is turned clock-wise the ratchet 68 will approach and slide over the teeth 78 of the rack member 77 without affecting the signalling action of the filament 41.

After the vehicle turn has been made, and the operator now turns the steering wheel 60 counterclock-wise to straighten out the vehicle, it is obvious that the signal control member 62 will be rotated about the axis of the steering column 9 by the shaft 61 forming a portion of the base 53. In this event, the resilient rachet 68 will react against the stationary teeth 78 to move the control member 62 away from the stationary teeth and also away from the give-away stop member 65 to cause the finger 67 to return the signal control wheel and its rim 59 to a normal position as shown by Figure 4. Thus, the signal switch element 45 will be permitted to move out of electrical engagement with the switch element 47 and into electrical engagement with the switch element 46, and the filament 41 will be de-energized as a right direction signal. If the foot brake operated switch 28 is closed during this operation, the filament 41 will again be constantly energized as a stop signal filament. The rim may be depressed or rocked as this return or neutralizing action occurs so that the acoustic signal may be given at any time.

The control rim 59 is provided with a grip portion 8 so that the operator's thumb or fingers may be employed to operate the control wheel rim as the fingers slide over the steering wheel rim. Thus, the visual and acoustic vehicle signals may be given without removing the hand from the steering wheel. The control rim 59 may be operated from a normal position, or rocked or depressed at any angular position of the steering wheel. For example, the operator may change his original intentions to turn to the right and change from a right turn to a left turn after the right direction signal has been operated and before the steering wheel has been turned to the right. The control rim will be operated from the clock-wise rotated position through the normal position to the counterclock-wise position with one continuous movement. This may be done without regard to the status of the foot operated brake switch 28. If the foot brake switch 28 is closed during this signal reversal, the filament 41 is intermittently energized as a right direction signal. When the control rim is moved from the extreme right displacement to the extreme left displacement, the switch element 45 will be moved out of engagement with the switch element 47 and into engagement with the switch element 46. Thereafter, and during the said continuous movement of the control rim 59, the switch element 48 will be moved out of contact with the element 50 and into engagement with the switch element 49. During this action the filament 41 will be returned from a right direction signal status to a stop signal status, and the filament 37 will be changed from a stop signal status to a left direction signal status. During this reversing time the control wheel 59 may be rocked to energize the acoustic signal unit 24. It should be noted that this change from one direction signal to another may be made at any angular position of the steering wheel. Such operation has been found to be necessary at traffic circles under the condition wherein the vehicle is turning to the right as the steering wheel is relatively turned to the left. The change from the left to the right signal may be made with one movement of the operator's thumb as his right hand slides over the steering wheel rim preparatory to turning the steering wheel rim to the right. The horn may be energized by a pressure of the thumb or wrist during and after the rotation of the control rim 59, and without removing the fingers from the steering wheel rim or even locking at either of the rims 59 and 60. The control rim 59 may also be moved to the left from a neutral position to intermittently energize the filament 37 in the same manner as has been described for obtaining the right direction signal. The control member 62 will now be held by the give-away stop member 64 and the ratchet 85 will act to return the member 62 and the control rim 59 to a normal position. The tensions given to the element 45 and the spring 81 combine to always return the control member 62 to a normal position after release from the members 64 and 65. The same releasing action is found in the switch element 48 and the spring 82.

The conventional tail lamp 38 and its associated filament 39 is normally operative during periods of low visibility and thus the filament 39 will act as a reference light to the filaments 37 and 41 when energized as direction signal filaments, and also when the foot operated switch 28 is open. During normal non-direction signalling intervals the steering wheel is entirely free of ratchets 68 and 69, and the operation of the steering wheel alone cannot affect the signalling system.

However, when the control rim is turned to an operative position the selected signal will continue as long as the steering wheel is stationary or moved in the intended turning direction.

The connections between the leads at the lower end of the steering wheel as shown in Figure 1 may be made in a more or less conventional manner following approved practice of this respect.

While I have shown and described, and have pointed out in the annexed claims certain novel features of the present invention, it will be understood that various omissions, substitutions and changes in the form and details of the device illustrated and in the operation may be made by those skilled in the art without departing from the spirit of the invention.

For example, the circuit connections may be varied to fit the various conditions under which the system may be installed and operated, the object is to selectively close signal circuits to hold a selected direction signal in operative condition as long as the steering wheel is not reversed, and when the steering wheel is reversed to cause same to act to automatically return the selected direction signal to a normal operative status. The control normalizing means shown in Figures 5 and 6 is merely suggestive, and any known means of utilizing forces to move the control member 62 away from either of the holding give-away members 64 and 65 may be employed by those skilled in the art without departing from the spirit of the invention. The number 31 of Figure 1 is intended to diagrammatically indicate a conventional circuit interrupter, such as a thermostat, but any known current affecting device actuated by a motor energized from the battery B may be substituted.

I claim:

1. In a vehicle, the combination of a steering wheel rim, a manually actuated control wheel with a rim grip positioned adjacent the part of the rim which is gripped by the operator in the act of steering the vehicle and said control positioned in the path of movement of said wheel whereby the control can be readily found at all times without necessity of looking at the wheel rim, and a selector mounted on a stationary support so as to be selectively actuated by said control wheel, said selector including two double-throw single-pole switches each having a neutral position and a settable position.

2. In a vehicle, the combination of a steering wheel, a selectively settable wheel control carried by the steering wheel having a limited movement in two directions relative to the steering wheel and positioned in the path of the operator's hand to cause the same to function incidental to the movement of the operator's hand in the act to effect a steering of the vehicle, neutralizing means acting on said control when operated to a settable position to restore the same to an inoperative condition automatically when the steering wheel is reversed from its steering movement, and means selectively operated by the movement of the said control in either direction.

3. In a vehicle steering mechanism, a steering wheel provided with a rim, a selectively settable control wheel having a rim designed to be grasped by the operator's hand having a limited freedom of motion relative to the other wheel in a direction circumferential of the steering wheel rim, a circuit closer including two double-throw single-pole switches each having a neutral position and a settable position operatively controlled by the movement of said control wheel, and means energized by manual actuation of the steering wheel acting on said movable part of the control wheel and tending normally to restore the circuit closer to an inoperative position as the steering wheel is relatively reversed in steering motion.

4. In a device of the class described the combination of a steering wheel assembly including a steering wheel having a hollow hub, a settable control wheel mounted on the hub and provided with a limited degree of rotative freedom relative thereto, manually actuated mechanism mounted on a fixed support substantially within the hub, said mechanism normally free of the steering wheel and including two double-throw single-pole switches each having a neutral position and a settable position and a single-throw single-pole switch normally in a biased open position, and universal locking means also carried by the wheel to maintain the double-throw switches of the mechanism when actuated into an operative position when the said control is moved in one direction relative to the steering wheel, said steering wheel positioned to return the double-throw single-pole switches of the said mechanism to an inoperative position when moved in a direction opposite to the control movement of the control wheel, said mechanism operatively free of said steering wheel and said control wheel after movement into said normal position.

5. In a direction signal system forming a portion of a steering wheel assembly, a signal control wheel mounted on the hub of the steering wheel and having a limited degree of manually actuated rotational freedom relative thereto, said steering wheel having a hollow hub, circuit closer control means including two double-throw single-pole switches mounted on a fixed support and positioned substantially within said hub for causing the system to become selectively operative, and signal circuit closer setting means selectively actuated during the manual operation of the control wheel for causing the steering wheel to selectively maintain the said control in an operative position when rotated in one direction and thence to move the control to a neutral position when rotated in the opposite direction, said steering wheel being free of said control means after movement of same into said neutral position.

6. In a vehicle steering mechanism, the combination of a rotatable tubular member and a fixed tubular member mounted about a common axis, one of said members constituting a steering column provided with a steering wheel and the other constituting a mechanism supporting and positioning fixed shaft, means forming an electric circuit including leads in the fixed tubular member, a settable control wheel mounted on the steering wheel positioned by the rotatable tubular member and provided with a limited degree of rotational freedom relative thereto, and switch element including two double-throw single-pole switches each having a neutral position and a settable position supported by the fixed shaft and connected to said leads, means for selectively holding the control wheel and a selected switch in said settable positions, said switches manually movable into settable operative position by a said relative movement of the said control wheel and automatically maintained in an operative position by the said setting means and returned to an inoperative position as a function of the directional rotation of the steering wheel.

7. In a device of the class described, the combination of a steering wheel assembly including a wheel rim, a manually actuated settable control wheel provided with a grip rim, said control wheel mounted centrally on the steering wheel with the control rim adjacent the wheel rim and movable to a limited extent independently of the wheel rim, locking means, means actuated by the control wheel during its control movement to a settable position for causing the operative status of the control wheel to become dependent on the motion of the steering wheel according to the extent and direction of the steering wheel movement, thence to become operatively independent of said steering wheel movement after movement of said control wheel into a neutral position.

8. In a turnable vehicle mechanism, the combination of a rotatable tubular member and a fixed tubular member mounted about a common axis, said rotatable member constituting a vehicle steering column provided with a steering wheel on the upper end thereof and the fixed member constituting a circuit control means support, said circuit control forming a portion of a vehicle circuit organization including leads in the fixed member connected to the said circuit control means, a settable wheel mounted on the said steering wheel and having a limited relative movement thereto in three directions from and to a normal position, said circuit control means including two double-throw switches each having a neutral position and a settable position and a normally open biased single-throw switch, means for causing a rotational movement of the said settable wheel to selectively move one of the said double-throw switches into a settable position, means for causing an approximately axial movement of any portion of the said settable wheel to close the single-throw switch against its bias, said mean acting together to cause a combination of said rotational and axial movements to move one of the double-throw switches to a settable position and to also close the said single-throw switch means for holding the selected double-throw switch and said settable wheel at the said settable position, said holding means released by a subsequent movement of the steering wheel in a direction opposite to the switch setting movement of the said control wheel to return the said control settable wheel to a normal position and said selected set switch to a neutral position.

9. In a turnable vehicle circuit organization, a circuit control member including two double-throw single-pole switches each having a neutral position and a settable position and a normally open biased single-throw single-pole switch, manually actuated means coincidently closing said single-pole single-throw switch with the setting of the double-throw switch when desired, said manually actuated means also closing the said single-throw switch as both double-throw switches remain in the said neutral position when desired, means for holding the selected double-throw switch in the set position, said selected switch and said manually actuated means released from said held position as an automatic function of the directional turning of the vehicle.

10. In a coincidently controlled vehicle circuit organization including two double-throw switches each with a neutral position and a settable position and a biased normally open single-throw switch, means for coincidently moving one of the said double-throw switches to the said settable position and/or the single-throw switch to a closed position, means actuated by the said coincidental movement for setting the selected double-throw switch, and further means for automatically returning the selected set switch to a neutral position.

11. In a vehicle circuit organization, two circuit closers each having a neutral position and a settable position, a closer biased to open position, a single control means for selectively moving the closers singly and in groups to and from open and closed positions, means for selectively holding the said control means without affecting the manual opening and closing of the biased closer, and further means for automatically moving the control means out of the held position.

12. In combination, two concentrically mounted wheels adapted for simultaneous rotary movement, the first of said wheels being also adapted for limited rotary movement in either direction with respect to the second wheel, and means operating subsequent to such a limited rotation in either direction of the first wheel for returning the first wheel to its original position upon a rotation of the second wheel in a direction opposite to the rotation of the first wheel.

13. On a vehicle, a steering wheel, a rim concentrically mounted with and of lesser diameter than the steering wheel and adapted for concurrent manual actuation therewith, said rim designed to rotate simultaneously with the steerwheel and also designed to be rotated through a limited angle in either direction with respect to the steering wheel, and means operating upon a rotation of the steering wheel following a limited rotation of the rim in the opposite direction for returning the rim to its orignal poston.

HOWARD J. MURRAY.